United States Patent [19]
Slusher et al.

[11] Patent Number: 5,516,817
[45] Date of Patent: May 14, 1996

[54] FLAME RETARDANT MODIFIED ASPHALT-BASED MATERIAL AND PRODUCTS THEREFROM

[75] Inventors: Carter C. Slusher, Carmel; Eric A. Ogren, Indianapolis; William B. Gorman, Mooresville; Gary S. Thompson, Indianapolis; Edward G. Kane, Carmel; Arthur M. Usmani, Indianapolis, all of Ind.

[73] Assignee: Bridgestone/Firestone, Inc., Akron, Ohio

[21] Appl. No.: 430,082

[22] Filed: Apr. 27, 1995

[51] Int. Cl.$^6$ ............ C08L 95/00; C09K 21/04; C09K 21/12
[52] U.S. Cl. ............ 523/179; 524/68; 524/69; 524/70; 524/71
[58] Field of Search ............ 523/179; 524/68, 524/69, 70, 71; 428/291, 489

[56] References Cited

U.S. PATENT DOCUMENTS

| | | | |
|---|---|---|---|
| H1250 | 11/1993 | Gilmore et al. | 524/68 |
| 3,556,819 | 1/1971 | Koons | 523/179 |
| 3,978,014 | 8/1976 | van Beem et al. | 524/68 |
| 4,000,140 | 12/1976 | Tierney | 524/69 |
| 4,148,780 | 4/1979 | Blümel et al. | 524/62 |
| 4,273,685 | 6/1981 | Marzocchi et al. | 523/150 |
| 4,282,127 | 8/1981 | Desgouilles | 524/68 |
| 4,316,829 | 2/1982 | Roberts | 525/54.5 |
| 4,444,947 | 4/1984 | Harrington et al. | 525/545 |
| 4,600,635 | 7/1986 | Wiercinski et al. | 428/220 |
| 4,659,381 | 4/1987 | Walters | 106/18.16 |
| 4,659,389 | 4/1987 | Wombles et al. | 106/279 |
| 4,732,925 | 3/1988 | Davis | 524/426 |
| 4,749,622 | 6/1988 | Vonk et al. | 428/489 |
| 4,804,696 | 2/1989 | Jolitz et al. | 524/68 |
| 4,891,272 | 1/1990 | Ciaccia | 428/489 |
| 4,973,615 | 11/1990 | Futamura et al. | 524/66 |
| 5,026,747 | 6/1991 | Jolitz et al. | 524/64 |
| 5,055,135 | 10/1991 | Grube et al. | 106/281.1 |
| 5,100,715 | 3/1992 | Zimmerman et al. | 524/68 |
| 5,102,463 | 4/1992 | Jolitz et al. | 106/273.1 |
| 5,110,674 | 5/1992 | Grube et al. | 428/283 |
| 5,126,384 | 6/1992 | Davis et al. | 524/71 |
| 5,130,355 | 7/1992 | Hergenrother et al. | 524/71 |
| 5,206,276 | 4/1993 | Lee, Jr. | 524/151 |
| 5,328,943 | 7/1994 | Isobe et al. | 524/70 |

FOREIGN PATENT DOCUMENTS

| | | | |
|---|---|---|---|
| 0064630 | 11/1982 | European Pat. Off. | 524/69 |
| 0345402A1 | 12/1989 | European Pat. Off. | C08L 95/00 |
| 2517056 | 10/1976 | Germany | 524/70 |
| 57-85855 | 5/1982 | Japan | C08L 95/00 |
| 0006622 | 2/1983 | Japan | 524/68 |
| 0197762 | 10/1985 | Japan | 524/71 |

OTHER PUBLICATIONS

"FIREBRAKE® ZB Zinc Borate, The Unique Multifunctional Additive" by Shen, *Plastics Compounding*, 12 pages, (1985).

"Modified Bitumens Containing Thermoplastic Polymers" by Piazza et al., *Rubber Chemistry and Technology*, vol. 53, pp. 994–1005, (1980).

"The Role of Bitumen in Blends with Thermoplastic Rubbers for Roofing Applications" by Van Gooswilligen, International Water Proofing Association, pp. 45–52, (1986).

"Will toxicity concerns doom workhorse flame-retardant systems?", by Wood, *Modern Plastics*, pp. 40–44 (May 1990).

"Zinc Borate as a Flame Retardant, Smoke Suppressant, and Afterglow Suppressant" by Shen, Fire Retardant Chemical Association, pp. 1–28 (Mar. 1984).

*Primary Examiner*—Peter A. Szekely
*Attorney, Agent, or Firm*—Frank J. Troy, Sr.

[57] ABSTRACT

A flame retardant asphalt material useful for the processing and formation of a roofing membrane includes from about 40 to about 50 parts by weight of asphalt; from about 10 to about 20 parts by weight of a copolymer; from 0 to about 5 parts by weight of polypropylene homopolymer having at least about 45 percent by weight of crystallinity; from about 10 to about 40 parts by weight of a functional filler having a decomposition temperature above the processing temperature of the material; from about 0 to about 15 parts by weight of a non-functional filler; and, from about 0.5 to about 10 parts by weight of an intumescent material.

12 Claims, 2 Drawing Sheets

FLAME RETARDANT MODIFIED ASPHALT-BASED MATERIAL AND PRODUCTS THEREFROM

TECHNICAL FIELD

The present invention relates generally to a novel asphalt-based material useful for example, to form a roofing membrane. Specifically, the present invention relates to a modified asphalt membrane which is heat-seamable and demonstrates fire and smoke resistivity. When burned, the material exhibits improved production of water vapor and improved oxygen-impeding char formation.

BACKGROUND OF THE INVENTION

Asphalt-based roof sheeting is typically used as a single ply roofing membrane for industrial and commercial flat roofs. These membrane systems are preferred over conventional "built-up" asphalt roofing because the membrane systems are easier and safer to install. Typically, the membrane is applied to the roof in long strips and the strips are joined to each other and to the substrate, usually by heating with a torch, so as to create a continuous roofing surface. The roofing element acts as its own hot melt adhesive.

Elasticity and flexibility facilitate processing, installation and most importantly overall use of the asphalt membrane. It is well known in the art to add synthetic or natural polymeric material to the asphalt-based membrane, thereby achieving elasticity and flexibility. Typically, vinyl and olefin polymers are added to accomplish such results. Asphalt-based materials containing such polymeric material will be referred to herein as "modified asphalt materials" or similar language.

Flame retardancy is also a desirable characteristic to impart to such membranes. Asphalt compositions containing polyolefins or vinyl copolymers, however, are not flame retardant. To impart flame retardancy, it is known to add halogenated olefinic elastomers, fillers such as antimony trioxide, decabromo diphenyl oxide, chlorinated alicyclic hydrocarbon, alumina trihydrate, and chlorinated or brominated paraffins, as is discussed in U.S. Pat. Nos. 4,839,412 and 4,851,463. More specifically, others have attempted to impart flame retardancy to asphalt compositions containing vinyl copolymers by the addition of monoammonium phosphate, ammonium sulfate and methyl hydrogen polysiloxane as in U.S. Pat. No. 4,804,696; by the addition of potassium citrate and methyl hydrogen polysiloxane as in U.S. Pat. No. 5,026,747; by the addition of brominated diphenyl ether, antimony oxide and zinc borate as in U.S. Pat. No. 5,100,715; by the addition of ammonium sulfate, methyl hydrogen polysiloxane, muscovite mica and magnesium silicate as in U.S. Pat. No. 5,102,463; by the addition of colemanite as in U.S. Pat. No. 5,110,674; and by the addition of at least one halogenated flame retardant and at least one inorganic phosphorus containing compound as in U.S. Pat. No. 4,659,381.

A problem, however, arises when certain flame retardant additives are added to modified asphalt compounds. Particularly, the addition of calcium borate to an asphalt composition containing vinyl copolymers increases the viscosity of the resulting modified asphalt membrane. Increasing the viscosity of the membrane leads to several problems, namely, it decreases the processing speed at which the membranes are produced, it hinders the adjoining of the membrane seams once on the roof and, it shortens the useful life of the membrane. The membrane becomes brittle, specifically at cold temperatures.

A useful fire retardant membrane material should disperse or meltblend efficiently during processing, without such problems as foaming, evolution of toxic health and/or environmentally hazardous by-products, or the like.

A need exists therefore, for a modified-asphaltic material useful for the formation of a roofing membrane or the like, which material is easily processed substantially without hazardous by-products. The material should have good flame and smoke resistance, yet should retain adhesion to itself and to a substrate to which it might be applied, such as by the application of heat thereto. It is desirable that the material substantially retain the processing and use performance characteristics of the modified asphalt material without the addition of flame retarding components. The material and products according to the present invention meet these needs, as will be explored hereinbelow.

SUMMARY OF INVENTION

It is therefore an object of the present invention to provide an asphalt material.

It is another object of the invention to provide such a material which is capable of being formed into a flexible and elastomeric membrane and which is flame retardant.

At least one or more of the foregoing objects of the present invention, together with the advantages thereof over existing asphalt materials, which shall become apparent from the specification which follows, are accomplished by the invention as hereinafter described and claimed.

In general, a flame retardant asphalt material useful in the processing and formation of a roofing membrane comprises from about 40 to about 50 parts by weight of asphalt; from about 10 to about 20 parts by weight of a polymer selected from the group consisting of propylene/ethylene copolymer, atactic polypropylene, propylene-based thermoplastic olefin, high density polyethylene, polymethyl pentene, acrylic ester copolymers, and mixtures thereof; from 0 to about 5 parts by weight of polypropylene homopolymer having at least about 45 percent by weight of crystallinity; from about 10 to about 40 parts by weight of a functional filler having a decomposition temperature above the processing temperature of the material; from about 0 to about 15 parts by weight of a nonfunctional filler; and, from about 0.5 to about 10 parts by weight of an intumescent material.

PREFERRED EMBODIMENT FOR CARRYING OUT THE INVENTION

Figure 1:
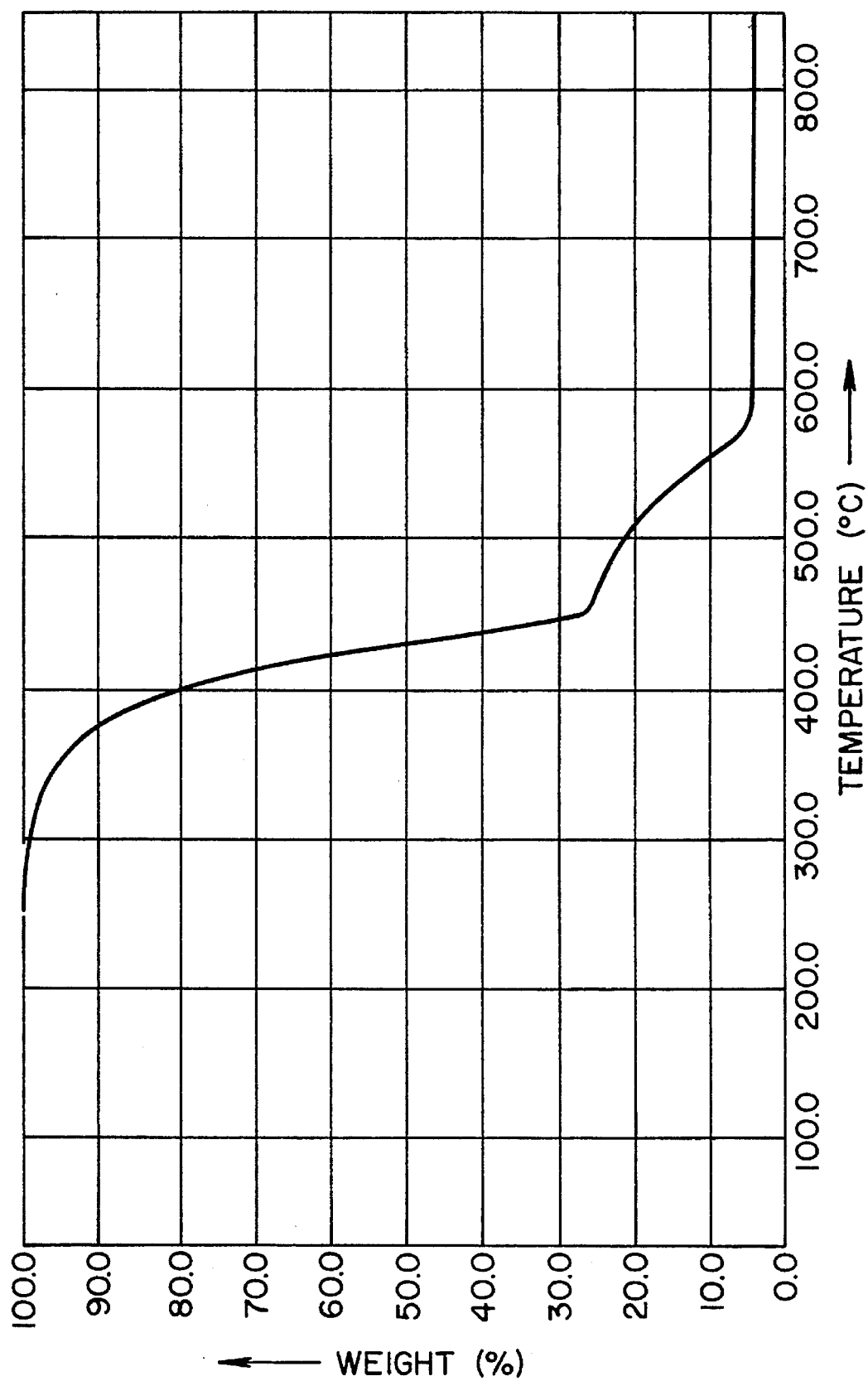
FIG. 1 is a thermogravimetric analysis (TGA) curve representative of the TGA data collected for Sample 1 according to the present invention and as discussed hereinbelow.

The present invention is directed toward a modified asphalt-based material. The asphalt material is elastomeric and flexible and is also flame and smoke retardant. Flame retardancy is provided by the use of a functional filler, while an intumescent material is added to increase the amount of char formed during burning. The improved char formation impedes the oxygen supply to the flame. By controlling the type and amount of char that is formed, flammability is mitigated yet the membrane formed from the material can still be "torched" in a conventional manner, without decreasing adhesion to the membrane itself or to the underlying substrate. It has also been found that smoke formation is suppressed during burning of the inventive material.

Any conventional asphalt material is useful in the present invention. For example, Ashland Petroleum Co. and Shell Oil Co. provide asphalt materials designated as AC-5, AC-10 and AC-15 which are useful. Such asphalts typically contain about 40 to about 52 parts by weight of aromatic hydrocarbons, about 20 to about 44 parts by weight of a polar organic compound, about 10 to about 15 parts by weight of asphaltene, about 6 to about 8 parts by weight of saturates, and about 4 to about 5 parts by weight of sulfur. Nevertheless, practice of the present invention is not limited by selection of a particular asphalt.

Typically, the molecular weight of the aromatic hydrocarbons present in asphalt ranges between about 300 and 2000, while the polar organic compounds, which generally include hydroxylated, carboxylated and heterocyclic compounds, have a weight average molecular weight of about 500 to 50,000. Asphaltenes, which are generally known as heavy hydrocarbons, are of a high molecular weight and are heptane insoluble. Saturates generally include paraffinic and cycloaliphatic hydrocarbons of about 300 to 2000 molecular weight.

Preferably, the asphalt material in the present invention is modified with a polymer material such as an elastomer. The specific polymer modifier will likely vary depending upon the end use of the material according to the invention, and the desired characteristics thereof. Examples of useful polymer modifiers include polypropylene homopolymer; propylene/ethylene copolymer such as for example, one having about 87 percent by weight of a propylene moiety and about 13 percent by weight of an ethylene moiety; thermoplastic polyolefins especially propylene-based; atactic polypropylene; polymethyl pentene; acrylic ester copolymers; high density polyethylene; mixtures thereof and the like.

The polypropylene homopolymer is preferably crystalline, having at least about 45 percent by weight crystallinity, and more preferably from about 46 to about 50 percent by weight crystallinity, or mixtures thereof. The homopolymer should be isotactic with minor amounts of atactic and other stereoregular structure. The percent crystallinity of the total polymer modifier should be at least 8.5 and may be as high as 12.

The material according to the invention includes a functional filler material. By "functional" it is understood to mean a material that will decompose endothermically releasing water vapor, thereby promoting the extinguishing of any flame or the like, and suppression of smoke. Examples of useful functional fillers include calcium borate, magnesium hydroxide (such as that available from Morton), basic magnesium carbonate, aluminum trihydrate (such as that from Lonza), zinc borate (such as that available from U.S. Borax as Firebrake ZB), gypsum (such as that available from USG), and mixtures thereof.

An example of a useful and commercially available calcium borate is that available from American Borate Co. under the trade name Colemanite. Significant to the invention is the fact that calcium borate, when exposed to high heat and flame, releases about 23 weight percent of water which serves to cool the heat and flames.

Furthermore, the functional filler material according to the present invention should have a decomposition temperature ($k_d$) above the temperature at which the inventive material will be processed either during initial formation of the composition and during subsequent processing into a product. While this temperature will vary depending upon the end use of the material and the processing techniques employed, a preferred functional filler has a decomposition temperature above about 200° C. The materials exemplified hereinabove possess such a decomposition temperature. Materials with lower decomposition temperatures will likely result in undesirable foaming and/or frothing of the material during subsequent processing at elevated temperatures. Of course, it is usually the case that asphalt materials are processed at elevated temperatures, such as up to about 200° C. If a higher processing temperature will be employed, then a functional filler having a higher decomposition temperature should be chosen. Similarly, the lower the processing temperature, the lower the decomposition temperature of the functional filler needs to be. TABLE I provides examples of useful functional fillers and their respective decomposition temperatures. Also reported in TABLE I is the relative amount of water released when the fillers are burned. Calcium carbonate, a non-functional filler, is included for comparison.

TABLE I

| DECOMPOSITION TEMPERATURES OF EXEMPLARY FUNCTIONAL FILLERS | | |
|---|---|---|
| Filler | $k_d$, °C. (Range) | Water released % |
| Mg hydroxide | 340–400 | 27 |
| Zn borate | 380–480 | 14 |
| Ca borate | 400–440 | 23 |
| Ca carbonate[a] | 700–840 | 0 |

[a]Non-functional

In addition, aluminum trihydrate and basic magnesium carbonate are known to have a decomposition temperature in the range of 180°–340° C., with a peak at about 320° C. Magnesium carbonate has a peak decomposition temperature at about 410° C. Of these three components and relative to each other, magnesium hydroxide is the most endothermic upon burning, basic magnesium carbonate the least, and aluminum trihydrate is between the other two.

The intumescent component in the inventive material will preferably promote the formation of char during burning. It is believed that the char formation will impede the oxygen supply to the area of burning, thus promoting the extinguishing of any flame or the like. Examples of useful intumescent materials include ammonium polyphosphate (such as that available from Monsanto as Phos-Chek P/40 and P/30), ethylenediamine phosphate (available from Albright and Wilson as Amgard NP), Spin Flam MF82 (Himont), and NH 1511 (Great Lakes) and mixtures thereof.

The present invention can also include other components, such as nonfunctional fillers, antioxidants, antibacterial components or the like. Examples of useful non-functional fillers include calcium carbonate, talc, mica, clay, diatomaceous earth, coal filler, carbon black, crumb rubber, and mixtures thereof.

In a preferred embodiment of the present invention, an asphalt material includes from about 40 to about 50, more preferably from about 45 to about 50, and more preferred still from about 46 to about 48 parts by weight of an asphalt material as described hereinabove.

The preferred material also includes from about 10 to about 20 parts by weight of a polymer modifier as described above, more preferably from about 12 to about 15 parts by weight and more preferred still about 14 parts by weight thereof.

From 0 to about 5 parts by weight of the crystalline polypropylene homopolymer is included in the inventive material, and more preferably from about 3 to about 4 parts by weight thereof.

With respect to the functional filler, it is preferred to include from about 10 to about 40 parts by weight thereof, with from about 25 to about 38 parts by weight being more preferred.

From about 0 to about 15 parts by weight of a nonfunctional filler is preferred, and from 0 to about 5 parts by weight thereof is more preferred.

As to the intumescent material, it is preferred to employ about 0.5 to about 10 parts by weight thereof, and more preferably from about 0.5 to about 2 parts by weight.

As stated hereinabove, the inventive material may be employed to prepare a flame retardant product, such as a roofing membrane or the like. Conventional techniques for preparing a membrane can be employed. Often, such membranes are reinforced with a polyethylene terephthalate or glass fiber mat or the like. The composition can also be molded for application in, for example, automobile/truck batteries and the like.

EXPERIMENTAL

In order to demonstrate the practice of the present invention, a number of flame retardant compositions were prepared according to the disclosure made hereinabove. A masterbatch polypropylene-modified asphalt was first prepared as follows.

A 2-gallon polypropylated asphalt was prepared to serve as a master batch for the preparation of flame retardant compounds according to the present invention. The masterbatch contained the components listed in TABLE II.

TABLE II

MASTERBATCH COMPONENTS

| Ingredient | Theoretical | Actual batch, grams |
|---|---|---|
| stearic acid | 0.2 | 14 |
| AC-5 Special | 57.3 | 4011 |
| E 1060[a] | 18.0 | 1260 |
| IPP (Himont)[b] | 4.5 | 315 |
| | 8.0 | 5600 |

[a]atactic propylene/ethylene copolymer is available from Eastman Chemical Co.
[b]isotactic polypropylene available from Himont.

Preheated asphalt, at 200° C., was charged into the process vessel. IPP (isotactic polypropylene) was added over a 20–25 minute period under high shear and the temperature was maintained at about 200° C. E 1060, at 180° C., was then added to the mass and mixed for I hour under high shear. Using the masterbatch, 14 compounds (500 grams each) were generated. The flame retardant package was blended with polypropylated asphalt under high shear at about 200° C. for about 1 hour. The components in each of the fourteen Samples is reported in TABLE III hereinbelow.

TABLE III

EXPERIMENTAL SAMPLE COMPONENTS

AMOUNTS IN PARTS BY WEIGHT

| | SAMPLE 1 | SAMPLE 2 |
|---|---|---|
| Polypropylated asphalt | 70 | 75 |
| Calcium borate | 30 | 25 |

TABLE III-continued

EXPERIMENTAL SAMPLE COMPONENTS

AMOUNTS IN PARTS BY WEIGHT

| | SAMPLE 3 | SAMPLE 4 |
|---|---|---|
| Polypropylated asphalt | 70 | 75 |
| Calcium borate | 20 | 20 |
| Magnesium hydroxide | 10 | 5 |
| | SAMPLE 5 | SAMPLE 6 |
| Polypropylated asphalt | 70 | 75 |
| DE 83[a] | 6 | 10 |
| Zinc borate | 4 | 5 |
| Calcium borate | 20 | 10 |
| | SAMPLE 7 | SAMPLE 8 |
| Polypropylated asphalt | 70 | 75 |
| DE 83 | 10 | 10 |
| Antimony oxide, KR[b] | 3 | 3 |
| Calcium carbonate | 17 | 12 |
| | SAMPLE 9 | SAMPLE 10 |
| Polypropylated asphalt | 70 | 75 |
| Calcium borate | 29 | 24 |
| Phos-Chek P-40 | 1 | 1 |
| | SAMPLE 11 | SAMPLE 12 |
| Polypropylated asphalt | 70 | 75 |
| Calcium borate | 25 | 20 |
| Spin Flam M-82[c] | 5 | |
| Amgard NP | | 5 |
| | SAMPLE 13 | SAMPLE 14 |
| Polypropylated asphalt | 70 | 75 |
| DG 8183[d] | 30 | 25 |

[a]DE 83 is decabromodiphenyl oxide available from Great Lake Chemicals
[b]KR is antimony oxide available from Amspec Chemical
[c]Spin Flam M-82 is halogen-free intumescent material available from Himont
[d]DG 8183 is halogenated resin available from Dover Chemical

TABLE IV

VISCOSITY DATA OF SAMPLES 1–14

| Sample | Viscosity, cPS |
|---|---|
| 1 | 2950 |
| 2 | 2370 |
| 3 | 3210 |
| 4 | 2670 |
| 5 | 1920 |
| 6 | 1830 |
| 7 | 2610 |
| 8 | 2050 |
| 9 | 3290 |
| 10 | 2460 |
| 11 | 2210 |

For evaluation including preliminary burning tests, membrane plaques were molded by pouring the hot compound of each Sample into separate 6"×6"×180 mil squares, and inserting a 6"×6"250 gram/square meter Hoechst Celanese mat. The squares were then compression molded at room temperature and demolded.

The preliminary burning test consisted of cutting 1"×5" test specimen from the plaques. Four samples were placed flat, almost side-by-side on a caul plate. They were then collectively torched by a propane torch for 2 minutes. Observations were made. The samples were then further individually torched for 2 minutes and further observations made, followed by more torching. At the end of the test, char formation tendencies were noted. The results are described as follows.

In Samples 1, 2, 3, and 4, a large amount of material was observed to have flowed out of the Samples. This was most noticeable in Sample 3. All samples self-extinguished quickly. Samples 3 and 4 extinguished slightly faster than 1 and 2. No char formation was noted in any of these samples.

Samples 5, 6, 7, and 8 performed satisfactorily with Sample 6 being the fastest to self-extinguish. These Samples performed at an equal or slightly better level than Samples 1–4.

Samples 9 and 10 had very good intumescent characteristics at the onset of torching. The flowing out of material that was noticeable in Samples 1 and 2 were reduced in Samples 9 and 10, but there still enough to permit torching. Both Samples 9 and 10 self-extinguished rapidly. Considerable char formation was observed although it was not very hard.

Both Samples 11 and 12 showed a flow of material, with Sample 12 having the most. Both Sample 11 and 12 self-extinguished with good char formation, yet the char was somewhat hard. Hard char and reduced flow may interfere in torch application.

Figure 2:
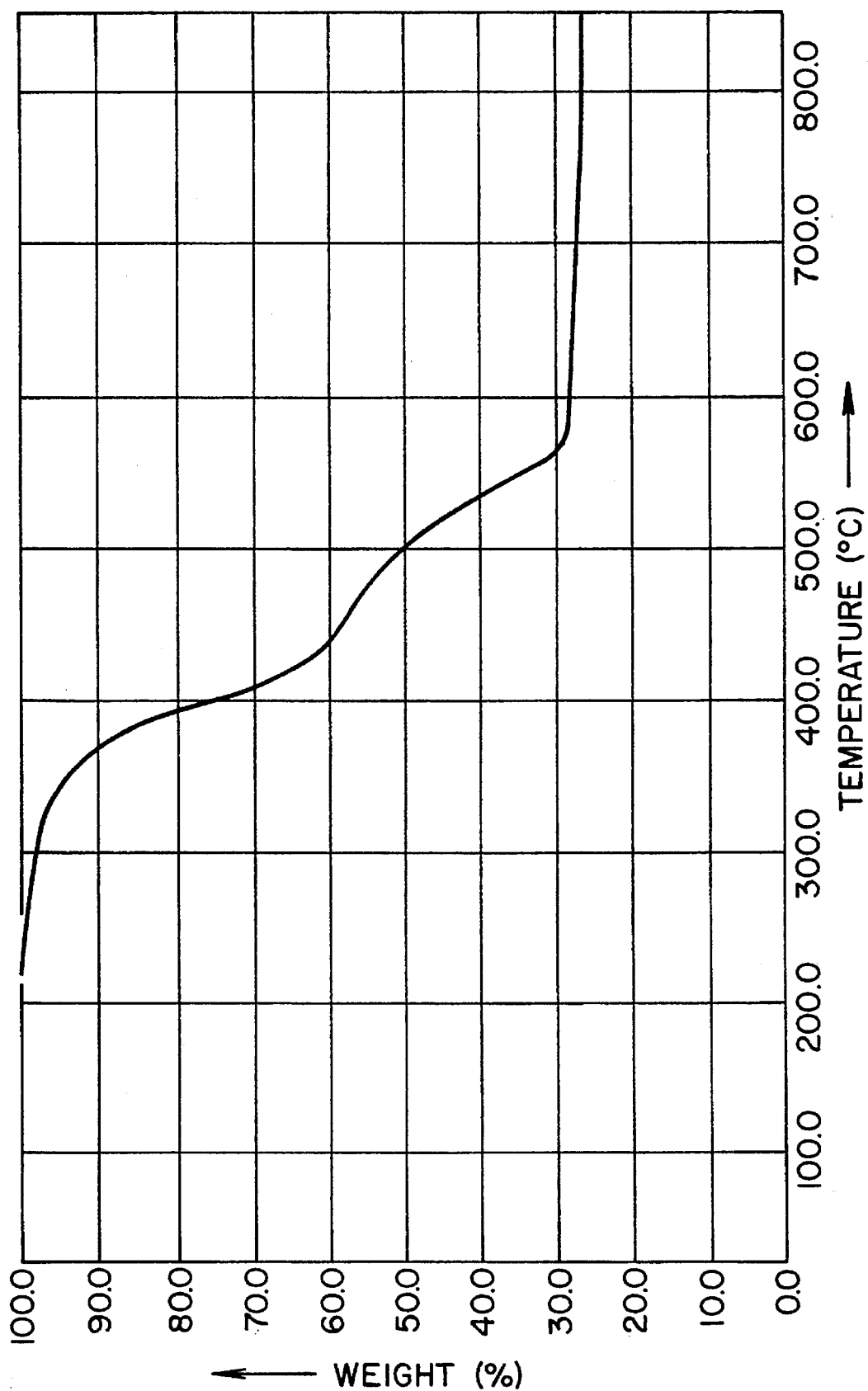
FIG. 2 is a similar TGA curve for Sample 12.

The char formation of Samples 1 through 12 was measured by thermogravimetric analysis (TGA) in air. The significant decomposition of asphalt began around 325° C. and tapered off at about 425° C. After this temperature, the decomposition (mostly polymer) proceeded at a reduced slope. By about 575° C., most of the present organics were decomposed leaving the char. Typical TGA of Samples 1 and 12 are shown in FIGS. 1 and 2, respectively. Percent char formed is shown in TABLE V.

TABLE V
CHAR FORMATION TEST RESULTS

| Sample Number | Percent Char Formed |
|---|---|
| 1 | 4.1 |
| 2 | 2.5 |
| 3 | 14.4 |
| 4 | 6.9 |
| 5 | 4.6 |
| 6 | 10.8 |
| 7 | 11.3 |
| 8 | 3.3 |
| 9 | 18.2 |
| 10 | 22.4 |
| 11 | 23.8 |
| 12 | 26.0 |

In actual test burning, formation of char was found to choke off the air supply and hence, further combustion was not supported. All samples passed heat stability tests, and experimental membranes passed cold flexibility save those containing magnesium hydroxide.

In a further test, three samples were made using Sample 10 formula as follows: 0.0 wt % Phos-chek (Sample 15), 0.5 wt % Phos-chek (Sample 16), 1.0 wt Phos-chek (Sample 17) ("wt %" is weight percent).

These samples passed heat stability and cold flexibility tests. The burning test results were slightly less than Sample 10. Char formation results are presented in TABLE VI.

TABLE VI
CHAR FORMATION RESULTS

| Sample | Percent Char |
|---|---|
| 15 | 10.7 |
| 16 | 22.0 |
| 17 | 20.7 |

SCALE-UP, TRIAL MANUFACTURING, AND FIRE TESTING

To further improve fire retarding characteristics, the following four formulas (Table VII) were scaled-up each to a 10-ton compound and converted into membranes on a production line.

TABLE VII
SCALE-UP FORMULAS

| Ingredient | 1A | 9A | 15A | 16A |
|---|---|---|---|---|
| Asphalt | 47.22 | 46.75 | 46.98 | 46.75 |
| E1060 | 14.75 | 14.60 | 14.67 | 14.60 |
| IPP | 3.69 | 3.65 | 3.67 | 3.65 |
| Calcium Borate | 34.34 | 34.00 | 29.65 | 29.50 |
| Calcium Carbonate | — | — | 5.03 | 5.00 |
| Phos-Chek P/40 | — | 1.00 | — | 0.5 |
|  | 100.00 | 100.00 | 100.00 | 100.00 |

Properties of these membranes are reported in TABLE VIII.

TABLE VIII
MEMBRANE PROPERTIES

| Property | SAMPLE | | | |
|---|---|---|---|---|
| | 1A | 9A | 15A | 16A |
| Viscosity at 190, cps[a] | 4125 | 4375 | 3875 | 3875 |
| Softening Point, °F. | 321 | 320 | 320 | 321 |
| Penetration, dmm | 34 | 32 | 29 | 35 |
| High Temp Pass, °F. | 300 | 300 | 300 | 300 |
| Low Temp Pass, °F. | 14 | 14 | 14 | 14 |
| MD[b] Peak Load | 100.45 | 89.86 | 92.71 | 103.6 |
| MD Elongation, % | 44.2 | 40.2 | 42.2 | 45.4 |
| CD[c] Peak Load | 66.21 | 64.74 | 73.43 | 65.02 |
| CD Elongation, % | 41.2 | 44.2 | 48.1 | 49.4 |

[a]antipoise
[b]MD is machine direction.
[c]CD is cross-machine direction.

Flame tests were conducted upon these membranes at Underwriters Laboratories. Test results are reported in TABLE IX.

TABLE IX
MEMBRANE BURN TEST RESULTS

| Sample | Slope | Maximum Flame Spread, Feet |
|---|---|---|
| 15A | 0.5 | 1.75 |
|  | 1.0 | 2.25 |
|  | 2.0 | 3.75 |
| 1A | 2.0 | 4.0 |
|  | 2.5 | 5.0 |
|  | 2.75 | 5.75 |
| 16A | 2.5 | 4.0 |

TABLE IX-continued

MEMBRANE BURN TEST RESULTS

| Sample | Slope | Maximum Flame Spread, Feet |
|---|---|---|
|  | 3.0 | 5.0 |
|  | 3.5 | 6.0 |
| 9A | 3.5 | 6. |
|  | 3.5 | 6.25 |
|  | 5.0 | 8+ |

According to Underwriter's Laboratories test, a 6 feet rating is considered passing. The lower the number in Table IX, better the fire retarding tendencies.

Thus, it is evident that the flame retardant asphalt membrane of the present invention is highly effective for use as a roof sheeting. Also, it will be appreciated that the materials according to the invention are useful for the production of products other than roof membranes, such as battery cases, manhole seals, kitchen counter-tops and the like.

Based upon the foregoing disclosure, it should now be apparent that the use of the flame retardant modified asphalt membrane described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, the various components of the membrane set forth herein are not necessarily limited to those derived from a particular source or by a particular process or synthesis. Thus, the scope of the invention shall include all modifications and variations that may fall within the scope of the attached claims.

What is claimed is:

1. A flame retardant asphalt material useful for the processing and formation of a roofing membrane comprising:
    from about 40 to about 50 parts by weight of asphalt;
    from about 10 to about 20 parts by weight of a polymer selected from the group consisting of atactic propylene/ethylene copolymer, atactic polypropylene, thermoplastic polyolefins, high density polyethylene, polymethyl pentene, acrylic ester copolymers, and mixtures thereof;
    from 0 to about 5 parts by weight of polypropylene homopolymer having at least about 45 percent by weight of crystallinity;
    from about 10 to about 40 parts by weight of a functional filler having a decomposition temperature above the processing temperature of the material;
    from about 0 to about 15 parts by weight of a non-functional filler; and,
    from about 0.5 to about 10 parts by weight of an intumescent material.

2. A material as in claim 1, wherein said propylene/ethylene copolymer is about 87 percent by weight of polypropylene and about 13 percent by weight of ethylene.

3. A material as in claim 1, comprising from about 3 to about 5 parts by weight of said polypropylene homopolymer.

4. A material as in claim 1, wherein said functional filler is selected from the group consisting of calcium borate, magnesium hydroxide, basic magnesium carbonate, aluminum trihydrate, zinc borate, gypsum, and mixtures thereof.

5. A material as in claim 1, wherein said non-functional filler is selected from the group consisting of calcium carbonate, talc, mica, clay, diatomaceous earth, coal filler, carbon black, crumb rubber and mixtures thereof.

6. A material as in claim 1, wherein said intumescent material is selected from the group consisting of ammonium polyphosphate, ethylenediamine phosphate, phosphoric acid and their salts and mixtures thereof.

7. A method of preparing a flame retardant product comprising the steps of:
    forming a composition and processing said composition into the product;
    said step of forming including mixing from about 40 to about 50 parts by weight of asphalt; from about 10 to about 20 parts by weight of a copolymer selected from the group consisting of atactic propylene/ethylene copolymer, atactic polypropylene, thermoplastic polyolefin, high density polyethylene, polymethyl pentene, and mixtures thereof; from 0 to about 5 parts by weight of polypropylene homopolymer having at least about 45 percent by weight of crystallinity; from about 10 to about 40 parts by weight of a functional filler having a decomposition temperature above the processing temperature of the material; from about 0 to about 15 parts by weight of a non-functional filler; and, from about 0.5 to about 10 parts by weight of an intumescent material.

8. A method as in claim 7, wherein said step of forming includes mixing a propylene/ethylene copolymer which is about 87 percent by weight of propylene and about 13 percent by weight of ethylene.

9. A method as in claim 7, wherein said step of forming includes mixing from about 3 to about 5 parts by weight of said polypropylene homopolymer.

10. A method as in claim 7, wherein said step of forming includes mixing a functional filler selected from the group consisting of calcium borate, magnesium hydroxide, basic magnesium carbonate, aluminum trihydrate, zinc borate, gypsum, and mixtures thereof.

11. A method as in claim 7, wherein said step of forming includes mixing said non-functional filler selected from the group consisting of calcium carbonate, talc, mica, clay, diatomaceous earth, coal filler, carbon black, crumb rubber and mixtures thereof.

12. A method as in claim 7, wherein said step of forming includes mixing said intumescent material which is selected from the group consisting of ammonium polyphosphate, ethylenediamine phosphate, phosphoric acid and their salts and mixtures thereof.

* * * * *